Patented July 14, 1936

2,047,492

UNITED STATES PATENT OFFICE 2,047,492

PROCESS FOR MANUFACTURING ANHYDROUS ALKALI POLYSULPHIDES

Erik Reissmann, Wolfen, Kreis Bitterfeld, and Hermann Wolff, Dessau in Anhalt, Germany, assignors to I. G. Farbenindustrie Aktiengesellschaft, Frankfort-on-the-Main, Germany No Drawing. Application August 11, 1932, Serial No. 628,444. In Germany September 5, 1931

2 Claims. (Cl. 23—138)

Our present invention relates to a new process for manufacturing anhydrous polysulphides containing any desired ratio of alkali to sulphur.

Anyhydrous alkali polysulphides have hitherto been made by an inconvenient and costly process, namely by the reaction of sulphur on a monosulphide or hydrosulphide in alcoholic or ethereal solution. Another process has consisted in heating hydrated monosulphide with an excess of sulphur in a current of hydrogen, the latter serving for removal of the water of the reaction and subsequent separation of the excess of sulphur in the form of sulphuretted hydrogen. Neither process has led to a definite sulphide, for instance tetrasulphide, in a sufficient degree of purity and commercial success has not attended either process.

According to this invention anhydrous, practically pure polysulphide containing any desired ratio of alkali to sulphur is obtained in a simple manner by mixing molten sulphur with anhydrous alkali sulphide, made by reducing an alkali sulphate by means of a gaseous reducing agent.

Such an alkali sulphide serving as the starting material in our present process is obtainable, for instance, in a single operation by reducing sodium sulphate in the mass by means of hydrogen or other suitable gaseous reducing agents with or without addition of an appropriate supplementary agent, such as sodium sulphide or metal compounds, the mass being maintained by a suitable adjustment of the temperature between about 500 to about 700° C. in the solid state from the commencement to the end of the reaction. At the temperatures referred to melting of the reaction mass does not occur, with the result that a granular anhydrous sodium sulphide is obtained.

The temperature of the reacting mass consisting according to our invention of molten sulphur and anhydrous alkali sulphide is raised gradually in correspondence with the rising melting points, the initial temperature being about 200° C; the vessel for the reaction is preferably a directly heated closed iron vessel provided with a stirrer. In order to avoid loss of sulphur by combustion, the reaction is advantageously carried out in an indifferent atmosphere, for example in nitrogen. By suitably adjusting the dose of the added alkali sulphide one can obtain a polysulphide of any desired composition, that is to say, there is brought into the reaction a quantity of the constituent materials corresponding with the different proportions necessary for the formation of the desired sulphide. As the reaction is exothermic and the sodium sulphide, for instance, is very prone to react, it generally suffices to heat the mixture to the temperature of the reaction, whereupon the process proceeds without further application of heat and is completed by the spontaneous rise of temperature in the mass. When the mass has become homogeneous it is removed from the vessel and cooled with exclusion of air. In order to eliminate small quantities of impurities originating, for instance, from the sulphur used, the mass before it solidifies may be allowed to settle or filtered through a hot filter.

The following examples illustrate the invention:

*Example 1.*—For making sodium tetrasulphide, 350 kilos of lump sulphur are melted in a directly heated closed iron stirring vessel. When the temperature has risen to 180–200° C., there are introduced continuously 300 kilos of anhydrous sodium sulphide of 98 per cent. strength, which has been made by reduction of the sulphate by means of a suitable gas. The sodium sulphide dissolves in the sulphur immediately, notwithstanding its fragmentary form, with considerable evolution of heat and during the introduction the temperature rises without additional heating to 320–340° C. The temperature remains constantly above the melting point of the mixture. The homogeneous mass is now forced by pressure of nitrogen into iron drums in which it solidifies. The solidified mass is ground and contains about 45 per cent. of sodium sulphide and 55 per cent. of sulphur.

*Example 2.*—For making alkali disulphide 42 parts of sulphur and 100 parts of sodium sulphide of 98 per cent. strength are mixed and heated in the manner described in Example 1, the temperature being allowed to rise gradually to about 440° C. The homogeneous solidified mass contains 70 per cent. of sodium sulphide and 28.5 per cent. of sulphur.

*Example 3.*—300 kilos of anhydrous sodium sulphide of 98 per cent. strength are removed from the furnace in which the material is being produced by gaseous reduction of the sulphate and introduced directly into the reaction vessel. To this mass, heated to about 600 to about 700° C., 350 kilos of fused sulphur are added. The heat remaining in the hot sodium sulphide and the heat of reaction which produces the polysulphide supply the heat necessary for fusion of the mass undergoing reaction.

It is obvious that our present invention is not limited to the foregoing examples or to the specific details given therein. Thus, for instance, in a completely analogous manner anhydrous potassium polysulphides may be produced by starting from an anhydrous potassium sulphide. Instead of sulphur a fused mass rich in sulphur may be used.

What we claim is:

1. A process for manufacturing anhydrous alkali metal polysulphides which comprises treating an alkali metal sulphate with a reducing gas, at a temperature between about 500° and about 700° C., while maintaining the reaction mass in the solid state and then mixing such an amount of fused sulphur as is necessary to obtain the desired polysulphide with the hot reaction mass, thereby utilizing the heat of the reaction mass from the first step to promote the reaction between the sulphur and the reduction product of the first step.

2. A process of manufacturing anhydrous sodium tetrasulphide which comprises treating sodium sulphate with a reducing gas, at a temperature between about 500° and about 700° C. under such conditions that the reaction mass remains in the solid state and then adding 350 kgs. of fused sulphur to 300 kgs. of the hot reaction mass, thereby utilizing the heat of reaction mass from the reduction step to promote the reaction between the sulphur and the product of the reduction step.

ERIK REISSMANN.
HERMANN WOLFF.